Patented Nov. 6, 1973

3,770,776
2-(HYDROXY - 1 - ALKYNYL)-5-OXOCYCLOPENT-1-ENEHEPTANOIC/OCTANOIC ACIDS AND DERIVATIVES THEREOF
Paul W. Collins, Wheeling, and Raphael Pappo, Skokie, Ill., assignors to G. D. Searle & Co., Chicago, Ill.
No Drawing. Continuation-in-part of application Ser. No. 740,976, June 28, 1968. This application June 4, 1970, Ser. No. 43,577
Int. Cl. C07c 61/36
U.S. Cl. 260—345.7       9 Claims

ABSTRACT OF THE DISCLOSURE

2 - (hydroxy - 1 - alkynyl) - 5 - oxocyclopent - 1-eneheptanoic/octanoic acids and derivatives thereof are useful as anti-microbial agents, e.g., anti-bacterial, anti-protozoal and anti-fungal, and also as pepsin-inhibitory agents. These compounds are preparable by the sequence of reactions involving the condensation of 9-oxodecanoic or 10-oxoundecanoic acid with dimethyl oxalate, heating of the resulting 2,3,5-trioxo-4-methoxyalylcyclopentaneheptanoic acid or the corresponding octanoic acid derivative with hydrochloric acid to afford 2,3,5-trioxocyclopentaneheptanoic acid or the corresponding octanoic acid, catalytic hydrogenation of the latter substance to produce 2,5-dioxocyclopentaneheptanoic acid or the corresponding octanoic acid, reaction of that compound with ethanol in the presence of sulfuric acid, thus affording ethyl 2-ethoxy-5-oxocyclopent-1-eneheptanoate or the corresponding octanoate, saponification to afford the corresponding carboxylic acid, condensation of that acid with a 3-tetrahydropyran-2'-yloxy-1-alkynyl magnesium bromide, decomposition of the resulting Grignard adduct to yield a 2-(3-tetrahydropyran-2'-yloxy-1-alkynyl)-5-oxocyclopent-1-eneheptanoic acid or the corresponding octanoic acid and cleavage of the tetrahydropyran-2-yl group, thus affording a 2-(hydroxy-1-alkynyl)-5-oxocyclopent-1-eneheptanoic acid or the corresponding octanoic acid.

---

This application is a continuation-in-part of our co-pending application Ser. No. 740,976, filed June 28, 1968 now abandoned.

The present invention is concerned with novel chemical compounds characterized by a cyclopentane ring and a 1-alkynyl side chain and more particularly with 2-(hydroxy-1-alkynyl)-5-oxocyclopent-1-eneheptanoic and octanoic acids and derivatives thereof represented by the following structural formula

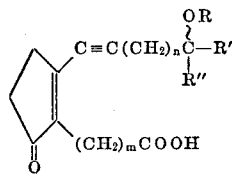

wherein R can be hydrogen or a tetrahydropyran-2-yl group, R' is an alkyl or cycloalkyl radical possessing 1 to 10 carbon atoms, R" is hydrogen or a methyl radical, or R' and R" together comprise the residue of a cycloalkyl radical such as cyclopentyl or cyclohexyl, the wavy line indicates the alternative (3R) or (3S) stereoisomer or the racemic mixture corresponding, $m$ is 6 or 7 and $n$ is 0 or 1.

The alkyl radicals containing 1 to 10 carbon atoms are typified by methyl, ethyl, propyl, butyl, and the like. The cycloalkyl radicals denoted in that structural formula are exemplified by cyclopentyl and cyclohexyl.

The compounds of this invention are conveniently manufactured by utilizing 9-oxodecanoic and 10-oxoundecanoic acid and di-(lower alkyl) oxalates as starting materials. Condensation of 9-oxodecanoic acid with dimethyl oxalate in the presence of potassium tertiary-butoxide thus affords 2,3,5-trioxo-4-methoxalylcyclopentaneheptanoic acid. Heating of the keto ester with hydrochloric acid results in loss of the alkoxalyl side chain, thus affording 2,3,5-trioxocyclopentaneheptanoic acid. That triketo acid is selectively reduced by catalytic hydrogenation, suitably with a 5% palladium-on-carbon catalyst to yield 2,5-dioxocyclopentaneheptanoic acid. Enol ether formation with concomitant esterification of that carboxyl group is effected, for example, by reaction with a lower alkanol in the presence of an acid catalyst. Reaction of 2,5-dioxocyclopentaneheptanoic acid with ethanol and sulfuric acid in benzene thus affords ethyl 2-ethoxy-5-oxocyclopent-1-eneheptanoate. Conversion to the free carboxylic acid is conveniently effected by room temperature saponification in ethanol, thus providing 2-ethoxy-5-oxocyclopent-1-eneheptanoic acid. Condensation of that substance with (3RS) 3-tetrahydropyran-2'-yloxy-1-octynyl- magnesium bromide or with the corresponding (3R) or (3S) enantiomer, each of which is prepared from the corresponding 3-tetrahydropyran-2'-yloxy-1-octyne, followed by acid hydrolysis of the Grignard adduct results in the respective 2-(3-tetrahydropyran-2'-yloxy-1-octynyl)-5-oxocyclopent-1-eneheptanoic acid. Removal of the tetrahydropyran-2-yl group is achieved by reaction at room temperature with hydrochloric acid and methanol, thus yielding 2-(3-hydroxy-1-octynyl)-5-oxocyclopent-1-eneheptanoic acid as the (3R) or (3S) enantiomer or the (3RS) racemic mixture corresponding.

The compounds of this invention are useful as a result of their valuable pharmacological properties. They are, for example, anti-microbial agents as is evidenced by their ability to inhibit the growth of bacteria such as *Diplococcus pneumoniae*, protozoa such as *Tetrahymena gelleii* and fungi such as *Trichophyton mentagrophytes*. In addition, they possess the ability to inhibit the enzymatic action of pepsin.

The anti-bacterial properties of the instant compounds are demonstrated by their activity when tested in the following assay:

Sterile blood agar is inoculated with a 24-hour broth culture of the bacterium, *Diplococcus pneumoniae*, whereupon approximately 5 mg. of the test compound is placed on the inoculated agar surface. The agar is then incubated at 37° for 24 hours, at the end of which time the agar immediately surrounding the compound is examined for clear zones of inhibition.

Confirmation of the anti-protozoal properties of the instant compounds is afforded by their activity when tested in the following assay:

A nutrient broth consisting of 12 g. of proteose peptone, 8 g. of sucrose and 1000 ml. of water is sterilized, inoculated with an axenic culture of the test organism and incubated at approximately 25° for 24 hours, whereupon 0.5 ml. quantities are aseptically transferred to each of 2 test tubes, one of which contains approximately 5 mg. of the compound. After a second 24 hour incubation at approximately 25°, growths of the organism are compared by microscopic examination.

Evidence for the anti-fungal property of these compounds is provided by their testing in the following assay:

Sterile Mycophil agar is inoculated with a suspension of spores of the fungus, *Trichophyton mentagrophytes*, whereupon a small amount of the test compound is placed on the surface. The agar is then incubated at room temperature for 96 hours, following which time it is examined for evidence of anti-fungal activity. A clear zone of inhibition immediately surrounding the test compound demonstrates anti-fungal activity.

Inhibition of the proteolytic activity of pepsin is demonstrated by the activity of the instant compounds when tested in the following assay:

The technique employed is a modification of that described by M. L. Anson in J. Gen. Physiol., 22, 79 (1938) and is dependent upon the fact that the proteolysis of hemoglobin results in liberation of peptides containing tyrosine and tryptophane units characterized by an absorption band in the ultraviolet spectrum at 275 millimicrons. Absorption at this wave length serves therefore as an index of the extent to which the proteolysis has occurred. Each test is carried out in 4 test tubes to which are added solutions, measured in ml., of hemoglobin, pepsin, compound, hydrochloric acid and perchloric acid. The additions are made immediately before and immediately after simultaneous incubation at 37° in accordance with the schedule shown in Table I.

TABLE I

| Test tube no. | Addns. at 0 time | | | | Addns. after 2 hours at 37° | | |
|---|---|---|---|---|---|---|---|
| | HGB | PEP | CPD | HCl | CPD | HCl | HClO₄ |
| 1 | 5 | 1 |   | 1 | 1 |   | 1 |
| 2 | 5 | 1 |   | 1 | 1 |   | 1 |
| 3 | 5 | 1 | 1 |   |   | 1 | 1 |
| 4 | 5 | 1 | 1 |   |   | 1 | 1 |

The hemoglobin solution (HGB) is prepared by mixing 60 g. of Hemoglobin Substrate Powder (bovine) [Worthington Biochemical Corporation, Freehold, N.J.] with 2000 ml. of double distilled water, successively filtering and centrifuging the resulting slurry, adjusting the pH of the saturated solution thus separated to 2.0 with 6 N hydrochloric acid, and finally diluting with an equal volume of pH 2.0 hydrochloric acid, prepared as described below. The pepsin solution (PEP) is prepared by dissolving 4.0 mg. of 3X Crystallized Pepsin (hog) [Pentenx, Incorporated, Kankakee, Illinois] in 200 ml. of pH 2.0 hydrochloric acid and diluting 6.25 ml. of the resulting solution with a further quantity of pH 2.0 hydrochloric acid q.s. 25 ml. The compound solution (CPD) is prepared by mixing 5 mg. of compound with 5.0 ml. of pH 2.0 hydrochloric acid and filtering out any material which remains insoluble. The hydrochloric acid solution (HCl) is prepared by diluting concentrated hydrochloric acid to pH 2.0 with double distilled water, The perchloric acid is prepared by diluting concentrated perchloric acid with dobule distilled water, q.s., 20% by volume. When the additions after incubation have been completed, the contents of each tube is filtered to remove undigested protein precipitated by the perchloric acid (which also serves to inactivate the enzyme), 1 ml. of each filtrate is diluted with 10 ml. of pH 5 sodium acetate buffer and the resulting solutions are subjected to U.V. spectrophotometric analyses whereby the absorptions at 275 millimicrons are determined. Among the 4 values thus obtained for each compound tested those deriving the tube numbers 1 and 2 serve as controls, being representative of absorption due to peptides produced by incubation of uninhibited enzyme and substrates superimposed upon absorption due to compound itself, whereas those deriving from tube numbers 3 and 4—so called "treats"—represent absorption due to peptides produced by incubation of enzyme and substrate in the presence of compound, superimposed upon absorption due to compound itself. A compound is considered pepsin inhibiting if the mean treat value (treat) is significantly ($P \leq 0.05$, Student's t-test) less than the mean control value (control) therefor. Pepsin is known to play a causal role in the production of peptic ulcer.

The instant compounds are useful also as intermediates to known compounds possessing pharmacological activity. (3S) 2-(3-hydroxy-1-octynyl)-5-oxocyclopent-1-eneheptanoic acid is thus reduced chemically, using either a zinc-lead or a zinc-copper couple to afford trans (3S) 2 - (3-hydroxy-1-octenyl)-5-oxocyclopent-1-eneheptanoic acid, which, as is described by Begdeman and Hamberg, Acta physiol. scand., 1967, 69, 320–326, was observed to inhibit the spontaneous motility of the isolated human myometrium and also to stimulate the rabbit intestine. Catalytic hydrogenation, using a palladium-on-carbon catalyst on which is deposited metallic lead, on the other hand, affords cis 2-(3-hydroxy-1-octenyl)-5-oxocyclopent-1-eneheptanoic acid.

The following examples described in detail compounds illustrative of the present invention and methods which have been devised for the preparation thereof. The invention however is not to be construed as limited thereby either in spirit or in scope as many modifications both in materials and methods will be apparent to those skilled in the art of organic synthesis. Throughout these examples temperatures are given in degrees centigrade (° C.) and quantities of materials in parts by weight except as otherwise noted.

EXAMPLE 1

To a solution of 56.5 parts of potassium metal in 936 parts of tertiary-butyl alcohol is added successively 102 parts of dimethyl oxalate and a solution of 54 parts of 9-oxodecanoic acid in 156 parts of tertiary-butyl alcohol. That addition is carried out over a period of about 40 minutes while the mixture is heated at the reflux temperature in an atmosphere of nitrogen. At the end of the addition period, heating is continued for about 90 minutes longer and the reaction mixture is cooled and filtered under nitrogen. The filter cake is added to a solution of dilute hydrochloric acid and that mixture is extracted with chloroform. The chloroform layer is separated, washed with water, dried over anhydrous sodium sulfate and stripped of solvent under reduced pressure. Recrystallization of the resulting residue from ether affords 2,3,5-trioxo - 4 - methoxalylcyclopentaneheptanoic acid, melting at about 127–129°.

EXAMPLE 2

A mixture containing 50 parts of 2,3,5-trioxo-4-methoxalylcyclopentaneheptanoic acid and 2,880 parts by volume of 2 N hydrochloric acid is slowly distilled in a nitrogen atmosphere for about 2 hours, then is cooled and decolorized with activated carbon. The filtrate thus obtained is concentrated to dryness under reduced pressure and the resulting residue is extracted with ethyl acetate. That organic solution is washed several times with saturated aqueous sodium chloride, then with water and finally dried over anhydrous sodium sulfate and stripped of solvent by distillation under reduced pressure. Recrystallization of the resulting residue from water affords pure 2,3,5-trioxocyclopentaneheptanoic acid, melting at about 102–104°.

EXAMPLE 3

A mixture containing 45.7 parts of 2,3,5-trioxocyclopentaneheptanoic acid, 13 parts of 5% palladium-on-carbon catalyst, 453 parts of glacial acetic acid and 63.3 parts of concentrated sulfuric acid is shaken with hydrogen at a pressure of 3 atmospheres until 2 molecular equivalents of hydrogen are absorbed. The reaction mixture is then filtered and the resulting filtrate is mixed with 100 parts of solid sodium acetate. Evaporation of the mixture to dryness affords a solid residue which is extracted with water. The resulting extract is filtered and the filter cake is washed with water, dried, then recrystallized from actone to afford white crystals of 2,5-dioxocyclopentaneheptanoic acid, melting at about 160–161.5°.

EXAMPLE 4

A mixture containing 26 parts of 2,5-dioxocyclopentaneheptanoic acid, 560 parts of ethanol, 440 parts of benzene and 14.7 parts of concentrated sulfuric acid is slowly distilled over a period of about 40 hours, during which time approximately 200 parts of distillate is collected. The residual mixture is cooled, diluted with approximately 350 parts of ether, then washed successively with dilute aqueous sodium hydroxide and water. The resulting neutral solution is dried over anhydrous sodium sulfate and evaporated to dryness under reduced pressure to afford, as a yellow liquid, ethyl 2-ethoxy-5-oxocyclopent-1-eneheptanoate, which substance is characterized by an ultraviolet absorption maximum at about 253.5 millimicrons.

EXAMPLE 5

A mixture containing 22.16 parts of ethyl 2-ethoxy-5-oxocyclopent-1-eneheptanoate, 785 parts of 0.1 N aqueous sodium hydroxide and 320 parts of ethanol is stored at room temperature for about 48 hours, then is concentrated to approximately ⅔ volume by distillation under reduced pressure. The residual solution is washed with ether, acidified with dilute hydrochloric acid, then extracted with ethyl acetate. The ethyl acetate extracts are washed with water, dried over anhydrous magnesium sulfate and evaporated to dryness by distillation under reduced pressure. The residual solid residue is purified by recrystallization from ether-benzene to afford 2-ethoxy-5-oxocyclopent-1-eneheptanoic acid, melting at about 65–66°.

EXAMPLE 6

To a solution of 0.3 part of (3RS) 1-octyn-3-oil in 53 parts of benzene is added 29.7 parts of dihydropyran and 0.15 part of p-toluenesulfonic acid. The initial exothermic reaction is controlled by cooling in an ice bath and the temperature is thus maintained at about 23°. The resulting reaction mixture is allowed to stand at room temperature for about 5 hours, then is diluted with benzene, washed successively with dilute aqueous sodium hydroxide and water, dried over anhydrous sodium sulfate and stripped of solvent under reduced pressure to afford, as a colorless liquid, (3RS) 1-octyn-3-ol 3-tetrahydropyran-2'-yl ether. It is characterized by infrared absorption maxima, in chloroform, at about 3.01, 3.38, 3.48, 6.58, 6.63, 6.80, 8.90, 9.30, 9.63, 9.80, and 10.21 microns.

EXAMPLE 7

To a solution of 12.6 parts of (3RS) 1-octyn-3-ol 3-tetrahydropyran-2'-yl ether in 112 parts of tetrahydrofuran is added 15.25 parts by volume of 3.3 M ethereal ethyl magnesium bromide and the resulting reaction mixture is allowed to stand at room temperature for about 2 hours. This solution containing (3RS) 3-tetrahydropyran-2'-yloxy-1-octynyl magnesium bromide is used as such in the procedure of Example 8.

EXAMPLE 8

To 15.7 parts of the Grignard reagent prepared in Example 7, dissolved in 112 parts of tetrahydrofuran, is added 2.54 parts of 2-ethoxy-5-oxocyclopent-1-eneheptanoic acid dissolved in 67.5 parts of tetrahydrofuran. The reaction mixture is kept under an atmosphere of nitrogen and is stirred at room temperature for about 24 hours, at the end of which time it is poured into approximately 350 parts of cold water. Acidification of that aqueous mixture with dilute hydrochloric acid is followed by extraction of the resulting acidic mixture with ether. The ether extracts are combined, then extracted several times with dilute aqueous potassium carbonate. Those alkaline extracts are combined, washed with ether and made acidic by the addition of dilute hydrochloric acid. Extraction of the latter mixture with ether affords an organic solution, which is dried over anhydrous sodium sulfate and concentrated to dryness under reduced pressure to afford, as a reddish brown oil displaying an ultraviolet maximum at about 269 millimicrons (3RS) 2-(3-tetrahydropyran-2'-yloxy-1-octynyl)-5-oxocyclopent-1-eneheptanoic acid. It is represented by the following structural formula

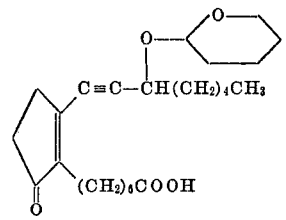

EXAMPLE 9

A mixture containing 3.5 parts of (3RS) 2-(3-tetrahydropyran-2'-yloxy-1-octynyl)-5-oxocyclopent-1-eneheptanoic acid, 48 parts of acetone, 30 parts of water, 1.6 parts of methanol and 1.2 parts of concentrated hydrochloric acid is allowed to stand at room temperature for about 4 hours. At the end of that reaction period, the mixture is concentrated to approximately ½ volume, then is made alkaline by the addition of dilute aqueous potassium carbonate. The alkaline solution is washed several times with ether, then is acidified with dilute hydrochloric acid and the resulting acidic solution is extracted with ether. The ether extracts are combined, dried over anhydrous sodium sulfate and evaporated to dryness under reduced pressure, thus affording a solid residue, which, after recrystallization from wet ether, affords (3RS) 2-(3-hydroxy-1-octynyl)-5-oxocyclopent-1-eneheptanoic acid monohydrate, melting at about 41–43° and displaying an ultraviolet absorption maximum at about 270 millimicrons. Dehydration of that monohydrate by heating under reduced pressure affords (3RS) 2-(3-hydroxy-1-octynyl)-5-oxocyclopent-1-eneheptanoic acid as a viscous oil. It is represented by the following structural formula

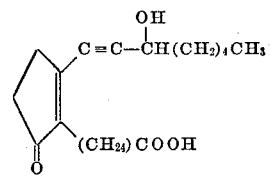

EXAMPLE 10

Method A

A mixture containing 3 parts of zinc dust, 3 parts of water and 0.9 part of concentrated hydrochloric acid is stirred in a nitrogen atmosphere for about 15 minutes, at the end of which time 0.93 part of lead acetate dissolved in 6 parts of water is added. Stirring is continued for about 5 minutes longer, at the end of which time the supernatant is decanted and the resulting zinc-lead couple is washed successively with water, acetone and isopropyl alcohol.

A solution of 0.3 part of (3RS) 2-(3-hydroxy-1-octynyl-5-oxocyclopent-1-eneheptanoic acid in 16 parts of isopropyl alcohol is stirred with 3 parts of a zinc-lead couple, prepared as described above, at room temperature for about 3 days in an atmosphere of nitrogen. At the end of that reaction period the mixture is filtered and the filtrate is diluted with water, acidified by means of dilute hydrochloric acid, then extracted with ether. The ether solution is washed with water, dried over anhydrous sodium sulfate and evaporated to dryness under reduced pressure. Chromatography of the resulting residue on silica gel followed by elution with 25% ethyl acetate in benzene affords pure trans (3RS) 2-(3-hydroxy-1-octenyl)-5-oxocyclopent-1-eneheptanoic acid, characterized by an ultraviolet absorption maximum at about 278 millimicrons. This material displays a single spot on a thin layer chromatogram.

Method B

A solution of 0.3 part of (3RS) 2-(3-hydroxy-1-octynyl)-5-oxocyclophent-1-eneheptanoic acid in 16 parts of isopropyl alcohol is stirred at room temperature for about 6 days in an atmosphere of nitrogen together with a zinc-copper couple prepared from 3 parts of zinc and 0.6 part of copper acetate in the same manner as that described in Method A for the preparation of the zinc-lead couple. The reaction mixture is then filtered and the filtrate is diluted with water, acidified with dilute hydrochloric acid and extracted with ether. Washing of the ether extract with water followed by drying over anhydrous sodium sulfate and evaporation of the resulting solution to dryness affords a residue, which is chromatographed on silica gel, then eluted with ethyl acetate and benzene to afford trans (3RS) 2 - (3-hydroxy-1-octenyl)-5-oxocyclopent-1-eneheptanoic acid, identical with the product of Method A.

EXAMPLE 11

A solution of 0.8 part of lead nitrate in 250 parts of water is shaken with 10 parts of 5% palladium-on-carbon catalyst in a hydrogen atmosphere at approximately 4 atmospheres pressure and room temperature until the uptake of hydrogen ceases. At the end of that time the catalyst is removed by filtration, then is washed with water and dried.

A mixture containing 0.3 part of (3RS) 2-(3-hydroxy-1-octynyl) - 5 - oxocyclopent - 1 - eneheptanoic acid, 0.03 part of the lead palladium-on-carbon catalyst described above and 22 parts of benzene is shaken with hydrogen at room temperature and atmospheric pressure until one molecular equivalent of hydrogen is absorbed. At the end of that time the catalyst is removed by filtration and the filtrate is evaporated to dryness to afford, as a viscous oil, cis (3RS) 2-(3-hydroxy - 1 - octenyl)-5-oxocyclopent - 1 - eneheptanoic acid, which exhibits an ultraviolet absorption maximum at about 276 millimicrons.

EXAMPLE 12

A mixture containing 1 part of 3β-acetoxy-androst-5-ene - 17 - carboxylic acid and 5 parts of thionyl chloride is allowed to stand at room temperature for about 24 hours, and at the end of that reaction period the mixture is evaporated to dryness under reduced pressure. The resulting residue is dissolved in benzene and the benzene solution is evaporated to dryness under reduced pressure. This procedure is repeated several times in order to remove all of the excess unreacted thionyl chloride. In this manner there is obtained 3β - acetoxyandrost - 5 - ene-17-carbonyl chloride.

A mixture containing 10.6 parts of the aforementioned 3β-acetoxyandrost - 5 - ene - 17 - carbonyl chloride, 3.5 parts of (RS) 1-octyn-3-ol and 176 parts of benzene is heated at the reflux temperature for about 1 hour. Refluxing is continued after the addition of 2.24 parts of pyridine dissolved in 88 parts of benzene. After 2 hours of additional reflux time the reaction mixture is cooled and filtered and the filtrate is evaporated to dryness by distillation under reduced pressure. The resulting residue is extracted into hexane and that solution is filtered, then kept at —20° for about 16 hours. The crystalline precipitate which forms is collected by filtration, washed on the filter with hexane, then purified by recrystallization from hexane, thus affording white crystals of (3R) 1-octyn-3-yl 3β-acetoxyandrost - 5 - ene - 17 - carboxylate, melting at about 116–116.5° and displaying an optical rotation, in chloroform, of —5°.

EXAMPLE 13

3β-acetoxyandrosta - 5,16 - diene - 17 - carbonyl chloride is prepared from 3β-acetoxyandrosta - 5,16 - diene-17-carboxylic acid and thionyl chloride by the procedure described in Example 12.

A mixture consisting of 10.6 parts of 3β - acetoxyandrosta - 5,16 - diene - 17 - carbonyl chloride, 3.5 parts of (RS) 1-octyn-3-ol and 2.24 parts of pyridine dissolved in 176 parts of benzene is heated at the reflux temperature for about 4 hours, then is cooled and filtered and the filtrate is evaporated to dryness under reduced pressure. The resulting residue is extracted into hexane and that organic solution is filtered, then kept at —20° for about 16 hours. The resulting precipitate is collected by filtration, then purified by recrystallization first from hexane, then from methanol to afford white crystals of (S) 1-octyn-3-yl 3β-acetoxyandrosta - 5,16 - diene - 17-carboxylate, melting at about 124–125° and displaying an optical rotation, in chloroform, of —67°.

A mixture consisting of 34 parts of (S) 1-octyn-3-yl 3β - acetoxyandrosta - 5,16 - diene - 17 - carboxylate, 300 parts by volume of 10% aqueous potassium hydroxide and 240 parts of methanol is heated at the reflux temperature under nitrogen for about 6 hours, then is stirred at room temperature for about 16 hours. Dilution of that mixture with water followed by extraction with pentane affords an organic solution, which is evaporated to dryness under reduced pressure, thus affording (3S) 1-octyn-3-ol, which compound displays an optical rotation, in ether, of —21.5°.

EXAMPLE 14

A mixture consisting of 7.5 parts (3S) 1-octyn-3-ol, 6.7 parts of dihydropyran and 0.1 part of p-toluenesulfonic acid is kept at room temperature for about 5 hours, then is diluted with ether, washed with dilute aqueous potassium carbonate, dried over anhydrous sodium sulfate and stripped of solvent under reduced pressure to afford (3S) 1-octyn-3-ol 3-tetrahydropyran-2'-yl ether, displaying an optical rotation, in ether, of —44°.

To a solution of 12.6 parts of (3S) 1-octyn-3-ol 3-tetrahydropyran - 2' - yl ether in 135 parts of tetrahydrofuran is added 15.25 parts by volume of 3.3 M ethyl magnesium bromide in ether. The resulting reaction mixture is kept at room temperature for about 2 hours and is used as such in the following reaction.

To the latter solution containing (3S) 3-tetrahydropyran-2'-yloxy-1-octynyl magnesium bromide is added dropwise, under nitrogen with vigorous stirring, a solution consisting of 2.54 parts of 2-ethoxy-5-oxocyclopent-1-eneheptanoic acid in 45 parts of tetrahydrofuran. After that addition is complete the reaction mixture is stirred at room temperature for about 16 hours, then is poured carefully into 500 parts by volume of cold dilute hydrochloric acid. That acidic mixture is extracted twice with ether and the ether extracts are combined, then extracted several times with dilute aqueous sodium carbonate. These sodium carbonate extracts are combined and acidified by the addition of dilute hydrochloric acid. Extraction of that acidic mixture with ether followed by removal of the solvent under reduced pressure affords 2-((3S) 3-tetrahydropyran-2' - yloxy - 1 - octynyl)-5-oxocyclopent-1-eneheptanoic acid. This compound is represented by the following structural formula

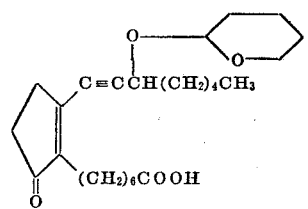

EXAMPLE 15

A reaction mixture consisting of 3 parts of 2-((3S) 3-tetrahydropyran-2'-yloxy - 1 - octynyl)-5-oxocyclopent-1-eneheptanoic acid, 76 parts of acetone, 4 parts of methanol, 2.4 parts of concentrated hydrochloric acid and 50 parts of water is allowed to stand at room temperature for about 6 hours, then is made alkaline by the addition of dilute aqueous sodium carbonate. That alkaline mixture is diluted with water, then is extracted with ether. The aqueous layer is acidified by the addition of dilute hydrochloric acid and extracted with ether several times. The ether extracts are combined, dried over anhydrous sodium sulfate and stripped of solvent by distillation under reduced pressure. The resulting residue is extracted into wet ether and the resulting extract is kept for about 16 hours at −20°. At the end of that time the solid precipitate which has formed is collected by filtration and purified by recrystallization from ether, thus affording 2-((3S) 3-hydroxy-1-octynyl) - 5 - oxocyclopent-1-eneheptanoic acid, melting at about 43–45°. This compound displays an optical rotation, in ether, of −16.5° and is further characterized by the following structural formula

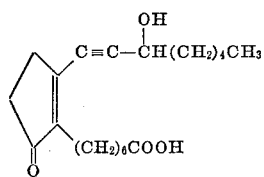

EXAMPLE 16

A mixture of 14.5 parts of zinc dust with 4.2 parts of concentrated hydrochloric acid and 15 parts of water is stirred, in a nitrogen atmosphere, for about 15 minutes. At the end of that time 25 parts of water and 4.2 parts of lead acetate are added portionwise with vigorous stirring. After completion of that addition the liquid phase is decanted and the solid zinc/lead couple is washed several times with water, then with acetone and finally with isopropyl alcohol. To that couple is then added a solution containing 7.5 parts of 2-((3S) 3-hydroxy-1-octynyl)-5-oxocyclopent-1-eneheptanoic acid dissolved in 360 parts of isopropyl alcohol. That reaction mixture is stirred at room temperature under nitrogen for about 72 hours, then is filtered and the filtrate is carefully acidified by the addition of dilute hydrochloric acid. That acidic mixture is diluted with water to the point of turbidity, then is extracted several times with ether. The ether extracts are combined, washed with water, dried over anhydrous sodium sulfate and stripped of solvent by distillation under reduced pressure. The resulting residue is dissolved in a 1:1 hexane-ethyl acetate mixture, then is cooled at −20° until precipitation of the product is complete. That precipitate is removed by filtration, then is purified by recrystallization from a 1:1 mixture of hexane and ethyl acetate to afford trans 2-((3S) 3-hydroxy-1-octenyl)-5-oxocyclopent-1-eneheptanoic acid, melting at about 73–73.5° and displaying an optical rotation, in chloroform, of +26.6.

EXAMPLE 17

When an equivalent quantity of (3R) 1-octyn-3-yl 3β-acetoxyandrost-5-ene-17-carboxylate is hydrolyzed according to the procedure of Example 13, there is obtained (3R) 1-octyn-3-ol, characterized by an optical rotation of +21.1° in ether.

EXAMPLE 18

The substitution of an equivalent quantity of (3R) 1-octyn-3-ol is the procedure of Example 14 results in (3R) 1-octyn-3-ol 3-tetrahydropyran-2′-yl ether, characterized by an optical rotation, in ether, of +50.5°.

EXAMPLE 19

When an equivalent quantity of (3R) 1-octyn-3-ol 3-tetrahydropyran-2′-yl ether is substituted in the procedures of Example 14, there are obtained, successively, (3R) 3-tetrahydropyran-2′-yloxy-1-octynyl magnesium bromide and 2-((3R) 3-hydroxy-1-octynyl)-5-oxocyclopent-1-eneheptanoic acid.

EXAMPLE 20

By the substitution of an equivalent quantity of 2-((3R) 3 - tetrahydropyran - 2′ - yloxy - 1 - octynyl)-5-oxocyclopent-1-eneheptanoic acid in the procedure of Example 15, there is produced 2-((3R) 3-hydroxy-1-octynyl)-5-oxocyclopent-1-eneheptanoic acid, melting at about 43–45° and displaying an optical rotation, in ether, of +13.5°. This compound is represented by the following structural formula

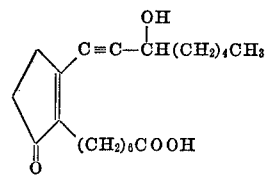

EXAMPLE 21

When 5 parts of 2-((3R) 3-hydroxy-1-octynyl)-5-oxocyclopent-1-eneheptanoic acid and the quantity of the zinc/lead couple obtained by the reaction of 90 parts of zinc with 28 parts of lead acetate in 240 parts of isopropyl alcohol is allowed to react according to the procedure of Example 16, there is obtained, after recrystallization from a 1:1 mixture of hexane and ethyl acetate, trans 2-((3R) 3 - hydroxy - 1 - octenyl) - 5 - oxocyclopent-1-eneheptanoic acid, melting at about 73°–73.5° and displaying an optical rotation, in chloroform, of −26°.

EXAMPLE 22

When 102 parts of 10-oxoundecanoic acid, 173 parts of dimethyl oxalate, 275 parts of potassium tertiary-butoxide and 2000 parts of tertiary-butyl alcohol are allowed to react according to the procedure of Example 1, there is obtained 2,3,5 - trioxo - 4 - methoxalylcyclopentaneoctanoic acid.

When the latter product is hydrolyzed with 2 N hydrochloric acid according to the proceddure described in Example 2, there is obtained, after recrystallization from water, 2,3,5-trioxocyclopentaneoctanoic acid, melting at about 110–111°.

The reduction of 2,3,5-trioxocyclopentaneoctanoic acid (28 parts) in a mixture containing 20.9 parts by volume of sulfuric acid, 260 parts by volume of acetic acid and 8 parts of 5% palladium-on-carbon catalyst affords 2,5-dioxocyclopentaneoctanoic acid, melting at about 140–142°.

When 23 parts of 2,5-dioxocyclopentaneoctanoic acid is allowed to react with 120 parts of ethanol, 440 parts of benzene and 3.6 parts of concentrated sulfuric acid according to the procedure described in Example 4, there is produced ethyl 2-ethoxy-5-oxocyclopent-1-eneoctanoate.

When a mixture containing 22 parts of ethyl 2-ethoxy-5 - oxocyclopent - 1 - eneoctanoate is hydrolyzed with 742 parts by volume of 0.1 N sodium hydroxide and 400 parts of ethanol for 3 days by the procedure described in Example 5, there is obtained 2-ethoxy-5-oxocyclopent-1-eneoctanoic acid, melting at about 43–45°.

EXAMPLE 23

When 10.16 parts of 2-ethoxy-5-oxocyclopent-1-eneheptanoic acid is allowed to react with (3RS) 3-tetrahydropyran-2′-yloxy-1-heptynyl magnesium bromide, prepared from 39.2 parts of 1-heptyn-3-ol 3-tetrahydropyran-2′-yl ether and 53.2 parts by volume of 3 M ethyl magnesium bromide in 720 parts of tetrahydrofuran by the procedure described in Example 7, there is obtained (3RS) 2-(3-tetrahydropyran-2′-yloxy - 1 - heptynyl)-5-oxocyclopent-1-eneheptanoic acid.

The substitution of the latter residue in the procedure of Example 9 results in a crude product which, after recrystallization from ether, affords pure (3RS) 2-(3-hydroxy-1-heptynyl)-5-oxocyclopent-1-eneheptanoic acid, melting at about 45–46°. This compound is represented by the following structural formula

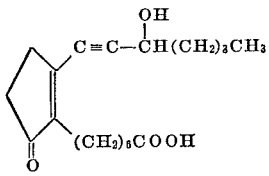

EXAMPLE 24

When 6.35 parts of 2-ethoxy-5-oxocyclopent-1-eneheptanoic acid is allowed to react with 27.5 parts of (3RS) 3-tetrahydropyran - 2' - yloxy - 3 - methyl - 1 - octynyl magnesium bromide, prepared according to the procedure of Example 7, according to the procedure of Example 8, there is obtained, after purification by chromatography on a silica gel column, (3RS) 2-(3-tetrahydropyran-2'-yloxy - 3 - methyl - 1 - octynyl) - 5 - oxocyclopent-1-eneheptanoic acid as a viscous oil, which displays an ultraviolet absorption maximum at about 270 millimicrons.

EXAMPLE 25

The reaction of 2.54 parts of 2-ethoxy-5-oxocyclopent-1 - eneheptanoic acid with (3RS) 3 - tetrahydropyran-2'-yloxy-1-hexynyl magnesium bromide, prepared according to the procedure of Example 7, by the procedure described in Example 8, results in (3RS) 2-(3-tetrahydropyran-2'-yloxy-1-hexynyl)-5-oxocyclopent-1- eneheptanoic acid.

Acid hydrolysis of the latter product by the procedure described in Example 9, affords, after recrystallization from ether, (3RS) 2-(3-hydroxy-1-hexynyl)-5-oxocyclopent-1-eneheptanoic acid, melting at about 53.5–54.5°.

EXAMPLE 26

When 2.54 parts of 2-ethoxy-5-oxocyclopent-1-eneheptanoic acid is allowed to react with (3RS) 3-tetrahydropyran-2'-yloxy-1-pentynyl magnesium bromide, prepared according to the procedure of Example 7, according to the procedure of Example 8, there is produced (3RS) 2-(3 - tetrahydropyran-2'-yloxy-1-pentynyl) - 5 - oxocyclopent-1-eneheptanoic acid.

The hydrolysis of an equivalent quantity of (3RS) 2-(3-tetrahydropyran-2'-yloxy - 1 - pentynyl) - 5 - oxocylopent-1-eneheptanoic acid by the procedure described in Example 9 results in (3RS) 2-(3-hydroxy-1-pentynyl)-5-oxocyclopent-1-eneheptanoic acid, exhibiting an ultraviolet absorption maximum at about 270 millimicrons.

EXAMPLE 27

The reaction of 2.54 parts of 2-ethoxy-5-oxocyclopent-1-eneheptanoic acid with 1-ethynyl-1-tetrahydropyran-2'-yloxycyclohexyl magnesium bromide, prepared from 10.35 parts of 1-ethynyl-1-tetrahydropyran-2'-yloxycyclohexane according to the procedure described in Example 7, by the procedure of Example 8, affords 2-(1-tetrahydropyran-2'-yloxy-1-ethynyl)-5-oxocyclopent - 1 - eneheptanoic acid.

When the latter product is hydrolyzed by the procedure described in Example 9, there is produced, as a viscous oil after chromatographic purification, 2-(1-hydroxy-1-cyclohexylethynyl)-5-oxocyclopent-1 - eneheptanoic acid, which compound exhibits ultraviolet absorption maximum at about 270.5 millimicrons and is represented by the following structural formula

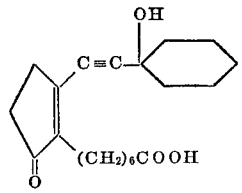

EXAMPLE 28

The reaction of 2.54 parts of 2-ethoxy-5-oxocyclopent-1-eneheptanoic acid with (3RS) 3-(tetrahydropyran-2'-yloxy-1-(3-methyl-1-pentynyl) magnesium bromide, prepared according to the procedure of Example 7, by the procedure of Example 8, results in (3RS) 2-[3-tetrahydropyran-2'-yloxy-(3-methyl - 1 - pentynyl)]-5-oxocyclopent-1-eneheptanoic acid as a viscous oil, exhibiting an ultraviolet absorption maximum at about 269.5 millimicrons.

EXAMPLE 29

To 600 parts by volume of 3M ethereal ethyl magnesium bromide is added 1350 parts of tetrahydrofuran over a period of about 40 minutes while the mixture is warmed to about 40°, thus causing the ether to distil. When the temperature of the distilling vapors reaches about 50°, the tetrahydrofuran solution is cooled and added to 270 parts of tetrahydrofuran previously saturated with acetylene. During this dropwise addition acetylene gas is continuously passed through the mixture and the addition of gas is continued for about 3 hours longer.

To that organic solution is then added, dropwise at room temperature, 62.4 parts of decyl aldehyde dissolved in 450 parts of tetrahydrofuran and the resulting mixture is stirred overnight at room temperature. To the reaction mixture is then added approximately 300 parts by volume of aqueous ammonium chloride and the resulting solution is filtered and stripped of solvent under reduced pressure. Distillation of the resulting residue under reduced pressure affords 1-decyn-3-ol.

By the procedures described in Examples 6 and 7, (3RS) 1-decyn-3-ol is converted to (3RS) 3-tetrahydropyran-2'-yloxy-1-decynyl magnesium bromide.

The reaction of 2.54 parts of 2-ethoxy-5-oxocyclopent-1-eneheptanoic acid with 14.28 parts of (3RS) 3-tetrahydropyran-2'-yloxy-1-decynyl magnesium bromide according to the procedure described in Example 8 results in (3RS) 2-(3 - tetrahydropyran-2'-yloxy-1-decynyl)-5-oxocyclopent-1-eneheptanoic acid.

Hydrolysis of the latter product according to the procedure of Example 9 results in (3RS) 2-(3-hydroxy-1-decynyl)-5-oxocyclopent - 1 - eneheptanoic acid, which, after recrystallization from ether-hexane, melts at about 76–77°.

EXAMPLE 30

The substitution of an equivalent quantity of decanal for octanal in the initial procedure of Example 29 results in (3RS) 1-dodecyn-3-ol.

(3RS) 1-dodecyn-3-ol 3 - tetrahydropyran-2'-yl ether and (3RS) 3-tetrahydropyran-2'-yloxy-1-dodecynyl magnesium bromide are prepared by the successive processes described in Examples 6 and 7.

The reaction of 2.54 parts of 2-ethoxy-5-oxocyclopent-1-eneheptanoic acid with 16 parts of (3RS) 3-tetrahydropyran-2'-yloxy-1-dodecynyl magnesium bromide according to the procedure described in Example 8 results in (3RS) 2-(3-tetrahydropyran-2'-yloxy - 1 - dodecynyl)-5-oxocyclopent-1-eneheptanoic acid.

The substitution of an equivalent quantity of the latter product in the procedure of Example 9 results in (3RS) 2-(3 - hydroxy-1-dodecynyl)-5-oxocyclopent-1-eneheptanoic acid, melting at about 29–30°.

EXAMPLE 31

The substitution of an equivalent quantity of nonanal in the procedure of Example 9 results in 1-undecyn-3-ol.

The substitution of an equivalent quantity of 1-undecyn-3-ol in the procedure of Example 6 results in (3RS) 1-undecyn-3-ol 3-tetrahydropyran-2'-yl ether.

When an equivalent quantity of (3RS) 1-undecyn-3-ol 3-tetrahydropyran-2'-yl ether is substituted in the procedure of Example 7, there is produced (3RS) 3-tetrahydropyran-2'-yloxy-1-undecynyl magnesium bromide.

The reaction of 2.54 parts of 2-ethoxy-5-oxocyclopent-1-eneheptanoic acid with the quantity of (3RS) 3-tetrahydropyran-2'-yloxy-1-undecynyl magnesium bromide prepared from 15.12 parts of (3RS) 1-undecyn-3-ol 3-tetrahydropyran-2'-yl ether and 16.6 parts by volume of ethyl magnesium bromide according to the procedure of Example 8 affords (3RS) 2-(3-tetrahydropyran-2'-yloxy-1-undecynyl)-5-oxocyclopent-1-eneheptanoic acid.

When an equivalent quantity of the latter product is hydrolyzed by the procedure of Example 9, there is produced (3RS) 2-(3-hydroxy-1-undecynyl)-5-oxocyclopent-1-eneheptanoic acid, which, after recrystallization from ether-hexane, affords the pure product, melting at about 81.5–82.5°.

EXAMPLE 32

The substitution of an equivalent quantity of 1-octyn-4-ol in the procedure of Example 6 results in (4RS) 1-octyn-4-ol 4-tetrahydropyran-2'-yl ether.

When an equivalent quantity of (4RS) 1-octyn-4-ol 4-tetrahydropyran-2'-yl ether is substituted in the procedure of Example 7, there is produced (4RS) 4-tetrahydropyran-2'-yloxy-1-octynyl magnesium bromide.

The reaction of 2.54 parts of 2-ethoxy-5-oxocyclopent-1-eneheptanoic acid with the quantity of (4RS) 4-tetrahydropyran-2'-yloxy-1-octynyl magnesium bromide prepared from 12.6 parts of (4RS) 1-octyn-4-ol 4-tetrahydropyran 2'-yl ether and 16.6 parts by volume of ethereal ethyl magnesium bromide and 180 parts of tetrahydrofuran according to the procedure of Example 8 affords (4RS) 2-(4-tetrahydropyran-2'-yloxy-1-octynyl) - 5 - oxocyclopent-1-eneheptanoic acid.

When an equivalent quantity of the latter product is hydrolyzed by the procedure of Example 9, there is produced (4RS) 2-(4-hydroxy-1-octynyl)-5-oxocyclopent-1-eneheptanoic acid, which melts at 53–54° after recrystallization from ether.

EXAMPLE 33

The substitution of an equivalent quantity of heptaldehyde in the procedure of Example 9 results in 1-nonyn-3-ol.

The substitution of an equivalent quantity of 1-nonyn-3-ol in the procedure of Example 6 results in (3RS) 1-nonyn-3-ol 3-tetrahydropyran-2'-yl ether.

When an equivalent quantity of (3RS) 1-nonyn-3-ol 3-tetrahydropyran-2'-yl ether is substituted in the procedure of Example 7, there is produced (3RS) 3-tetrahydropyran-2'-yloxy-1-nonynyl magnesium bromide.

The reaction of 2.54 parts of 2-ethoxy-5-oxocyclopent-1-eneheptanoic acid with the quantity of (3RS) 3-tetrahydropyran-2'-yloxy-1-nonynyl magnesium bromide prepared from 15.12 parts of (3RS) 1-nonyn-3-ol 3-tetrahydropyran-2'-yl ether and 16.6 parts of ethereal ethyl magnesium bromide together with 180 parts of tetrahydrofuran according to the procedure of Example 8 affords (3RS) 2-(3-tetrahydropyran-2'-yloxy-1-nonynyl)-5-oxocyclopent-1-eneheptanoic acid.

When an equivalent quantity of the latter product is hydrolyzed by the procedure of Example 9, there is produced (3RS) 2-(3-hydroxy-1-nonynyl)-5-oxocyclopent-1-eneheptanoic acid which, after recrystallization from ether, melts at about 67–68°.

EXAMPLE 34

When an equivalent quantity of cyclohexaldehyde is substituted in the procedure of Example 9, there is produced 1-cyclohexylpropyl-3-ol.

The substitution of an equivalent quantity of 1-cyclohexylpropyn-3-ol in the procedure of Example 6 results in (3RS) 1-cyclohexylpropyn-3-ol 3-tetrahydropyran-2'-yl ether.

When an equivalent quantity of (3RS) 1-cyclohexylpropyn-3-ol 3-tetrahydropyran-2'-yl ether is substituted in the procedure of Example 7, there is produced (3RS) 3-tetrahydropyran-2'-yloxy-1-cyclohexylpropynyl magnesium bromide.

The reaction of 2.54 parts of 2-ethoxy-5-oxocyclopent-1-eneheptanoic acid with the quantity of (3RS) 3-tetrahydropyran-2'-yloxy - 1 - cyclohexylpropynyl magnesium bromide prepared from 13.32 parts of 1-cyclohexylpropyn-3-ol 3-tetrahydropyran-2'-yl ether and 16.6 parts by volume of ethereal ethyl magnesium bromide together with 180 parts of tetrahydrofuran affords (3RS) 2-(3-tetrahydropyran-2'-yloxy-1-cyclohexylpropynyl) - 5 - oxocyclopent-1-eneheptanoic acid.

When an equivalent quantity of the latter product is hydrolyzed by the procedure of Example 9, there is produced (3RS) 2-(3-hydroxy-1-cyclohexylpropynyl)-5-oxocyclopent-1-eneheptanoic acid, which, after recrystallization from ether, affords the pure product, melting at about 74–75°.

EXAMPLE 35

When an equivalent quantity of cyclopentaldehyde is substituted in the procedure of Example 9, there is produced 1-cyclopentylpropynyl-3-ol.

The substitution of an equivalent quantity of 1-cyclopentylpropynyl-3-ol in the procedure of Example 6 results in (3RS) 1-cyclopentylpropynyl-3-ol 3-tetrahydropyran-2'-yl ether.

When an equivalent quantity of (3RS) 1-cyclopentylpropynyl-3-ol 3-tetrahydropyran-2'-yl ether is substituted in the procedure of Example 7, there is produced (3RS) 3-tetrahydropyran-2'-yloxy-1-cyclopentylpropynyl magnesium bromide.

The reaction of 2.54 parts of 2-ethoxy-5-oxocyclopent-1-eneheptanoic acid with the quantity of (3RS) 3-tetrahydropyran-2'-yloxy-1-cyclopentylpropynyl magnesium bromide prepared from 12.6 parts of (3RS) 1-cyclopentynylpropyn-3-ol 3-tetrahydropyran-2'-yl ether and 16.6 parts by volume of ethereal ethyl magnesium bromide together with 180 parts of tetrahydrofuran afford (3RS) 2-(3-tetrahydropyran-2'-yloxy-1 - cyclopentylpropynyl) - 5 - oxocyclopent-1-eneheptanoic acid.

When an equivalent quantity of the latter product is hydrolyzed by the procedure of Example 9, there is produced (3RS) 2 - (3 - hydroxy-1-cyclopentylpropynyl)-5-oxocyclopent-1-eneheptanoic acid monohydrate, which, after recrystallization from wet ether, melts at 49–50°.

EXAMPLE 36

The reaction of 2.7 parts of 2-ethoxy-5-oxocyclopent-1-eneoctanoic acid with the quantity of (3RS) 3-tetrahydropyran-2'-yloxy-1-octynyl magnesium bromide prepared from 12.6 parts of (3RS) 1-octyn-3-ol 3-tetrahydropyran-2'-yl ether and 16.6 parts by volume of ethereal ethyl magnesium bromide together with 180 parts of tetrahydrofuran affords (3RS) 2-(3-tetrahydropyran-2'-yloxy-1-octynyl)-5-oxocyclopent-1-eneoctanoic acid.

When an equivalent quantity of the latter product is hydrolyzed by the procedure of Example 9, there is produced (3RS) 2-(3-hydroxy-1-octynyl)-5-oxocyclopent-1-eneoctanoic acid, which melts at about 39–40° after recrystallization from ether.

What is claimed is:
1. A compound of the formula

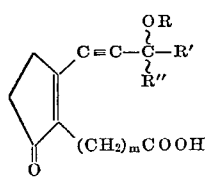

wherein R is selected from the group consisting of hydrogen and a tetrahydropyran-2-yl radical, R' is an alkyl radical of 1 to 10 carbon atoms, R" is hydrogen or a methyl radical and $m$ is an integer selected from the group consisting of 6 and 7.

2. A compound according to claim 1, wherein the stereochemical configuration of the oxygenated substituent in the alkynyl side-chain is (3S).

3. As in claim 1, the compound which is (3RS) 2-(3-tetrahydropyran - 2' - yloxy-1-octynyl)-5-oxocyclopent-1-eneheptanoic acid.

4. As in claim 1, the compound which is (3RS) 2-(3-hydroxy-1-octynyl)-5-oxocyclopent-1-eneheptanoic acid.

5. As in claim 1, the compound which is (3RS) 2-(3-hydroxy-1-octynyl)-5-oxocyclopent-1-eneoctanoic acid.

6. As in claim 1, the compound which is (3R) 2-(3-tetrahydropyran - 2' - yloxy-1-octynyl)-5-oxocyclopent-1-eneheptanoic acid.

7. As in claim 1, the compound which is (3S) 2-(3-tetrahydropyran - 2 '- yloxy-1-octynyl)-5-oxocyclopent-1-eneheptanoic acid.

8. As in claim 1, the compound which is (3R) 2-(3-hydroxy - 1-octynyl)-5-oxocyclopent-1-eneheptanoic acid.

9. As in claim 1, the compound which is (3S) 2-(3-hydroxy-1-octynyl)-5-oxocyclopent-1-eneheptanoic acid.

References Cited

Hardegger et al.: Helv. Chimica Acta, 50, 2501 (1967).
Just et al.: Tet Letters, 1967, 2093.
Klok et al.: Recv. Trav. Chim. 87, 813 (1968).
Yura et al.: Chem. Pharm. Bull. 17, 408 (1969).
Katsube et al., Agr. Biol. Chem. 33, 1078 (1909).
Corey et al., J.A.C.S. 90, 3245 (1968).

LORRAINE A. WEINBERGER, Primary Examiner

R. GERSTL, Assistant Examiner

U.S. Cl. X.R.

260—345.9, 397.1, 410.9, 413, 468 K, 468 D, 514 K, 514 D, 632 Y, 643 A; 424—317, 318